(12) United States Patent
Okubo et al.

(10) Patent No.: US 7,782,504 B2
(45) Date of Patent: Aug. 24, 2010

(54) IMAGE READING/RECORDING APPARATUS

(75) Inventors: Akio Okubo, Tokyo (JP); Takashi Awai, Chiba (JP); Hideyuki Terashima, Kawasaki (JP); Yoshiaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/406,245

(22) Filed: Apr. 19, 2006

(65) Prior Publication Data

US 2006/0243932 A1 Nov. 2, 2006

(30) Foreign Application Priority Data

Apr. 28, 2005 (JP) ............................. 2005-131886

(51) Int. Cl.
*H04N 1/04* (2006.01)
(52) U.S. Cl. ................. 358/498; 358/474; 358/296; 271/3.08; 271/8.1; 271/9.07; 399/361; 399/368
(58) Field of Classification Search ................. None
See application file for complete search history.

(56) References Cited

U.S. PATENT DOCUMENTS

| | | | | | |
|---|---|---|---|---|---|
| 5,038,218 | A | * | 8/1991 | Matsumoto | 358/296 |
| 5,651,623 | A | * | 7/1997 | Stodder et al. | 400/605 |
| 5,710,634 | A | * | 1/1998 | Kuriyama et al. | 358/296 |
| 5,727,890 | A | * | 3/1998 | Stodder et al. | 400/624 |
| 5,790,922 | A | * | 8/1998 | Takano | 399/94 |
| 5,800,083 | A | * | 9/1998 | Gaarder et al. | 400/185 |
| 5,826,133 | A | * | 10/1998 | Saito et al. | 399/2 |
| 6,135,438 | A | * | 10/2000 | Newman et al. | 271/9.07 |
| 6,178,017 | B1 | * | 1/2001 | Ishida | 358/498 |
| 6,297,885 | B1 | * | 10/2001 | Murakami | 358/1.1 |
| 6,433,897 | B1 | * | 8/2002 | Wilcox et al. | 358/498 |
| 7,077,396 | B2 | * | 7/2006 | Uwagaki et al. | 271/121 |
| 7,151,622 | B2 | * | 12/2006 | Suzuki et al. | 358/498 |
| 7,338,042 | B2 | * | 3/2008 | Shimizu | 271/110 |
| 7,349,127 | B2 | * | 3/2008 | Kadomatsu | 358/296 |
| 7,379,218 | B1 | * | 5/2008 | Terashima et al. | 358/498 |
| 7,382,506 | B2 | * | 6/2008 | Awai et al. | 358/498 |
| 7,513,493 | B2 | * | 4/2009 | Suzuki et al. | 271/9.07 |
| 2003/0067619 | A1 | * | 4/2003 | Suzuki et al. | 358/1.12 |

(Continued)

FOREIGN PATENT DOCUMENTS

JP    02-257755    10/1990

(Continued)

*Primary Examiner*—Mark K Zimmerman
*Assistant Examiner*—Dung D Tran
(74) *Attorney, Agent, or Firm*—Fitzpatrick, Cella, Harper & Scinto (57) ABSTRACT

Provided is an image reading/recording apparatus capable of actualizing downsizing and a decrease in cost of an apparatus body by commonizing components and functions of a document conveying system and a recording sheet conveying system, and enabling a user to readily clean a contaminated portion even when a reading surface of reading means and a white plate are contaminated. A separation feeding means, a reading means, conveying means, and discharging means are disposed in this sequence from an upstream side in a conveying direction, wherein the reading means is provided to read an undersurface of a document with a reading surface directed upward, and a white plate facing the reading surface of the reading means is disposed in an openable/closable manner.

3 Claims, 6 Drawing Sheets

U.S. PATENT DOCUMENTS

| | | | |
|---|---|---|---|
| 2004/0004321 A1* | 1/2004 | Uwagaki et al. | 271/117 |
| 2004/0105109 A1* | 6/2004 | Terashima et al. | 358/1.12 |
| 2004/0179045 A1* | 9/2004 | Awai et al. | 347/1 |
| 2005/0286942 A1 | 12/2005 | Terashima et al. | 399/361 |
| 2005/0286943 A1* | 12/2005 | Terashima et al. | 399/361 |
| 2006/0197997 A1* | 9/2006 | Oshida et al. | 358/498 |
| 2006/0228139 A1 | 10/2006 | Suzuki | 399/405 |

FOREIGN PATENT DOCUMENTS

| | | |
|---|---|---|
| JP | 7-183990 | 7/1995 |
| JP | 8-181815 | 7/1996 |
| JP | 2003-211758 | 7/2003 |
| JP | 2004-010266 | 1/2004 |
| JP | 2004-180145 | 6/2004 |
| JP | 2004-180146 | 6/2004 |
| JP | 2004-203510 | 7/2004 |
| JP | 2004-203512 | 7/2004 |

* cited by examiner

Prior Art

IMAGE READING/RECORDING APPARATUS

BACKGROUND OF THE INVENTION

1. Field of the Invention

The present invention relates to an image reading/recording apparatus such as a facsimile that integrally includes a recording portion for recording on a recording sheet and a reading portion for reading a document (original).

2. Related Background Art

Figure 6:
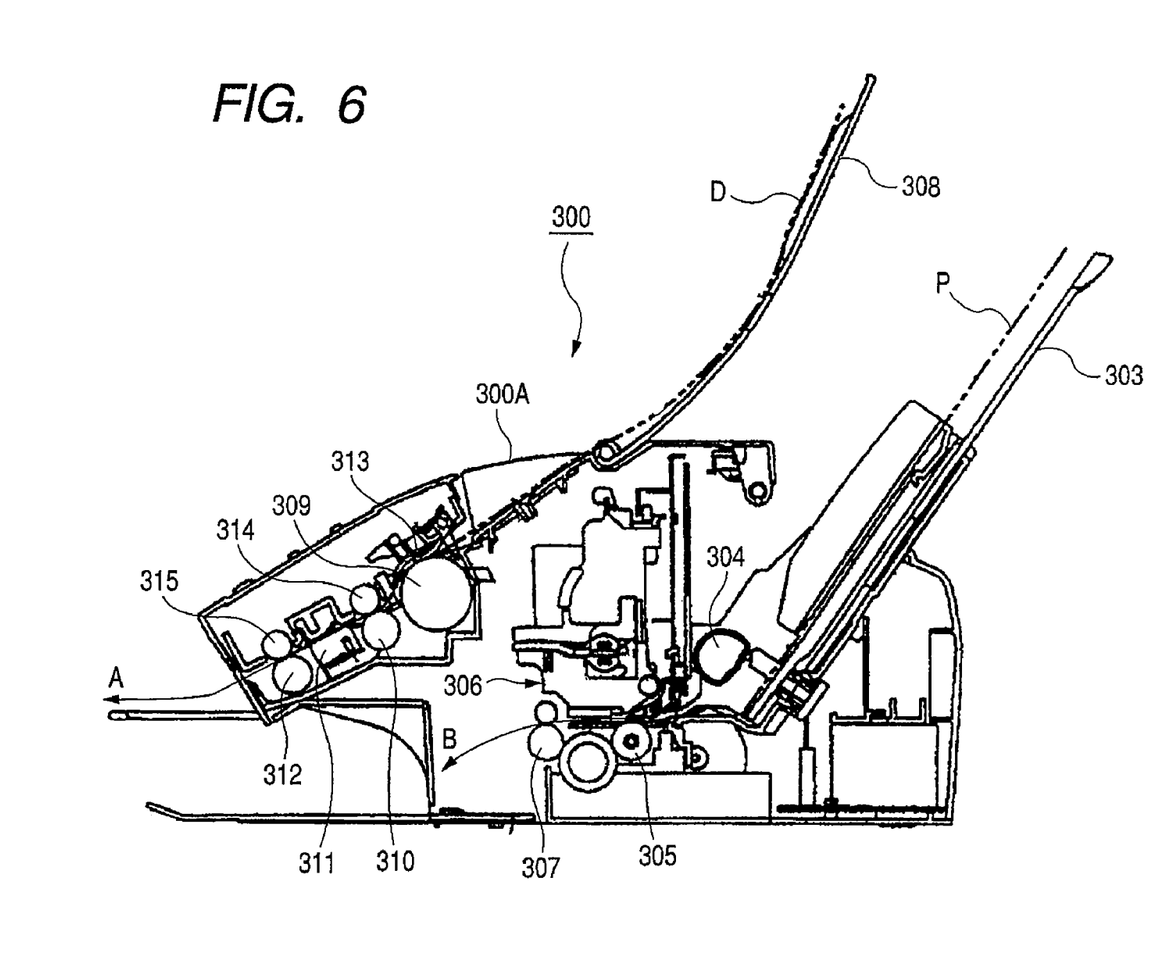
FIG. 6 is a schematic vertical sectional view showing a configuration of a conventional image reading/recording apparatus in a way that exemplifies a facsimile.

FIG. 6 is a schematic vertical sectional view showing a configuration of a conventional image reading/recording apparatus in a way that exemplifies a facsimile. Referring to FIG. 6, recording sheets P are stacked (loaded) on a recording sheet holding member (recording sheet tray) 303 and are fed on a sheet-by-sheet basis by a recording sheet feeding roller 304 and by an unillustrated separation mechanism into an apparatus body 300A of a facsimile 300. The recording sheets P fed into the apparatus body 300A are conveyed via a recording portion 306 by a conveying roller 305, and images are recorded on the recording sheets P by the recording portion 306. The image-recorded recording sheets P are discharged outside the apparatus body (in a direction indicated by an arrowhead B) by a sheet discharging roller 307.

On the other hand, documents (originals) D are placed on a document holding member (document tray) 308 and are set in a state of abutting on a wedge-like portion of a separation feeding portion constructed of a document feeding roller 309 and a separating piece 313. When the document feeding roller 309 is rotated upon an image reading command, in a plurality of documents staying at the wedge-like portion, only the document brought into contact with the feeding roller 309 is separated from other documents by dint of a frictional force and thus fed.

The separated-and-fed document D is conveyed by a conveying portion constructed of a document feeding roller 310 and a pressing roller 314 and by a sheet discharging portion constructed of a sheet discharging roller 312 and a pressing roller 315. Image information retained on the document D is read by the reading portion such as a contact image sensor 311 while being conveyed, and the document D is discharged outside (in a direction of an arrowhead A) the apparatus body 300A.

In the above-mentioned image reading/recording apparatus such as the facsimile that integrally includes the recording portion for recording on the recording sheet and the reading portion for reading the document, in the case of downsizing the apparatus in response to demands etc in the market, it is considered that a conveying path for the recording sheets and a conveying path for the documents (originals) are shared with each other. This path sharing scheme provides a configuration of removing the feeding roller and the sheet discharging roller used for conveying the document and also removing a drive motor for conveying the document. Such a configuration of the apparatus makes it possible to actualize downsizing of the image reading/recording apparatus the cost-down thereof.

In the image reading/recording apparatus including the common conveying path as described above, the recording sheet and the document guided to the common conveying path may be fed respectively by different separation feeding portions but are, it is desirable, fed by the same separation feeding portion for attaining the downsizing. Further, it is desirable that the reading sensor for reading the image information retained on the document be fixedly disposed on the common conveying path. In the case of fixedly disposing the reading sensor, however, it is desirable that the reading sensor be disposed anterior to (on an upstream side of) the common conveying roller (refer to, e.g., Japanese Patent Application Laid-Open No. H07-183990, hereinafter Patent document 1). The arrangement that the reading sensor is anterior to (on the upstream side of) the common conveying roller, makes it feasible to eliminate influence of an ink mist occurred when performing the recording operation and to prevent the image from being recorded onto a platen, which occurs when failing to feed the sheet.

According to the configuration disclosed in Patent document 1 given above, however, if the reading surface of the reading means and the white plate are contaminated with an ink mist occurred when performing the recording operation and with paper powder produced from the recording sheets and the documents, a user found it was hard to clean the contaminated portion. Further, if configured to enable the user to clean the reading surface and the white plate, such inconvenience arose that the apparatus configuration became complicated and was upsized, which brought about cost-up.

SUMMARY OF THE INVENTION

The present invention was devised in view of such technical problems.

It is an object of the present invention to actualize downsizing of an apparatus body and decreasing a coast thereof by commonizing components and functions of a document conveying system and of recording sheet conveying system.

It is another object of the present invention to provide an image reading/recording apparatus enabling a user to readily, even if the reading surface of the reading means and the white plate are contaminated, clean the contaminated portion.

To accomplish the above objects, an image reading/recording apparatus according to the present invention comprises recording means for recording on a recording sheet, reading means for reading a document, separation feeding means for sequentially feeding the recording sheets or the documents to the recording means or the reading means sequentially from the uppermost sheet in the stacked sheets, conveying means for conveying the recording sheets or the documents, and sheet discharging means for discharging the recording sheets or the documents, wherein the separation feeding means, the reading means, the conveying means, the recording means and the sheet discharging means are disposed in this sequence from an upstream side in a conveying direction, and the reading means is so provided as to read an undersurface of the document with a reading surface directed upward.

According to the present invention, the separation feeding means, the reading means, the conveying means, the recording means and the sheet discharging means are disposed in this sequence from the upstream side in the conveying direction. With this arrangement, it is possible to actualize downsizing of the apparatus body and decreasing a cost thereof by commonizing the components and the functions of the document conveying system and of the recording sheet conveying system. Still further, the present invention provides an image reading/recording apparatus enabling the user to readily, even if the reading surface of the reading means and the white plate are contaminated, clean the contaminated portion.

DETAILED DESCRIPTION OF THE PREFERRED EMBODIMENT

Figure 1:
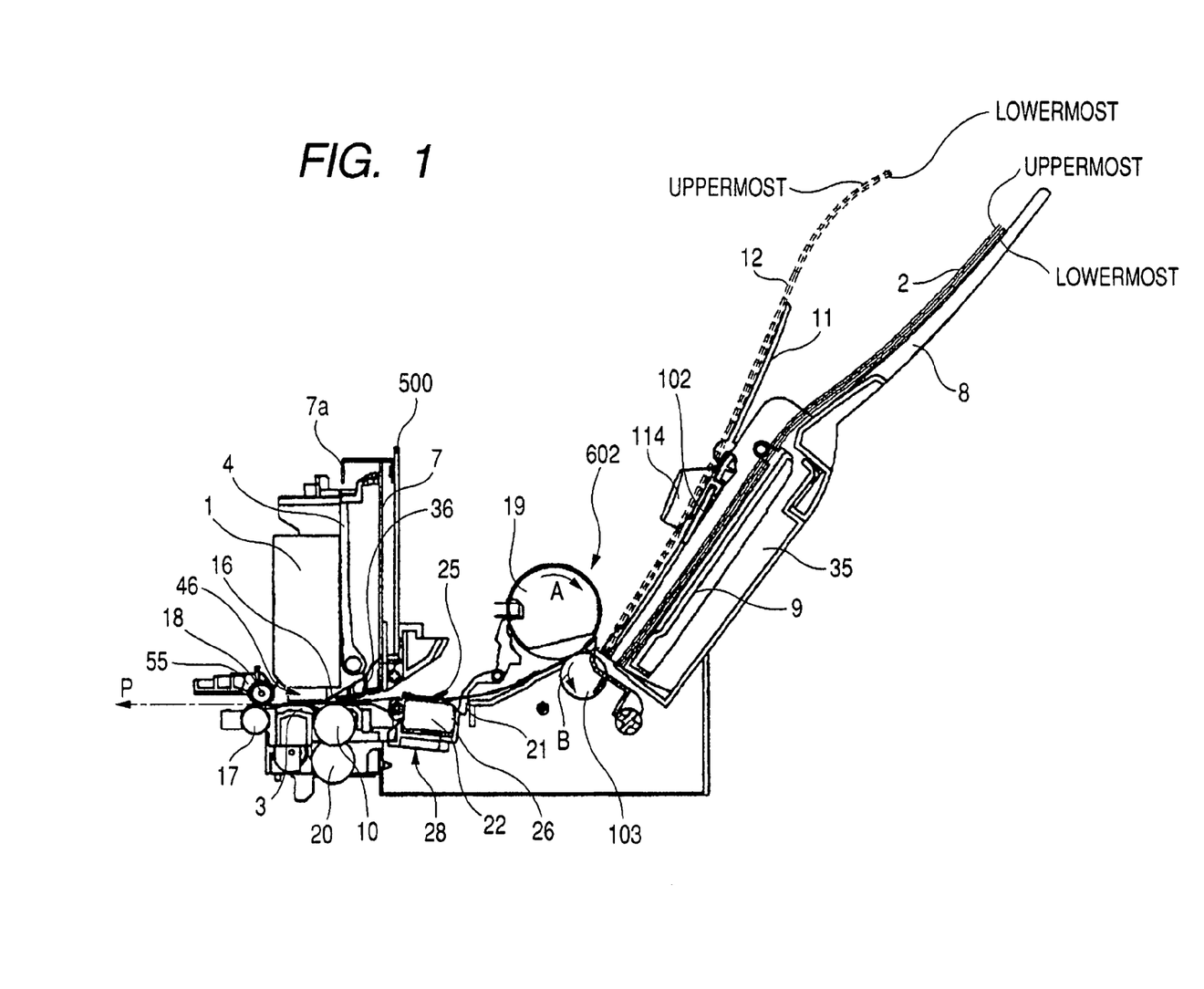
FIG. 1 is a schematic vertical sectional view showing a configuration in one embodiment of an image reading/recording apparatus according to the present invention.
Figure 2:
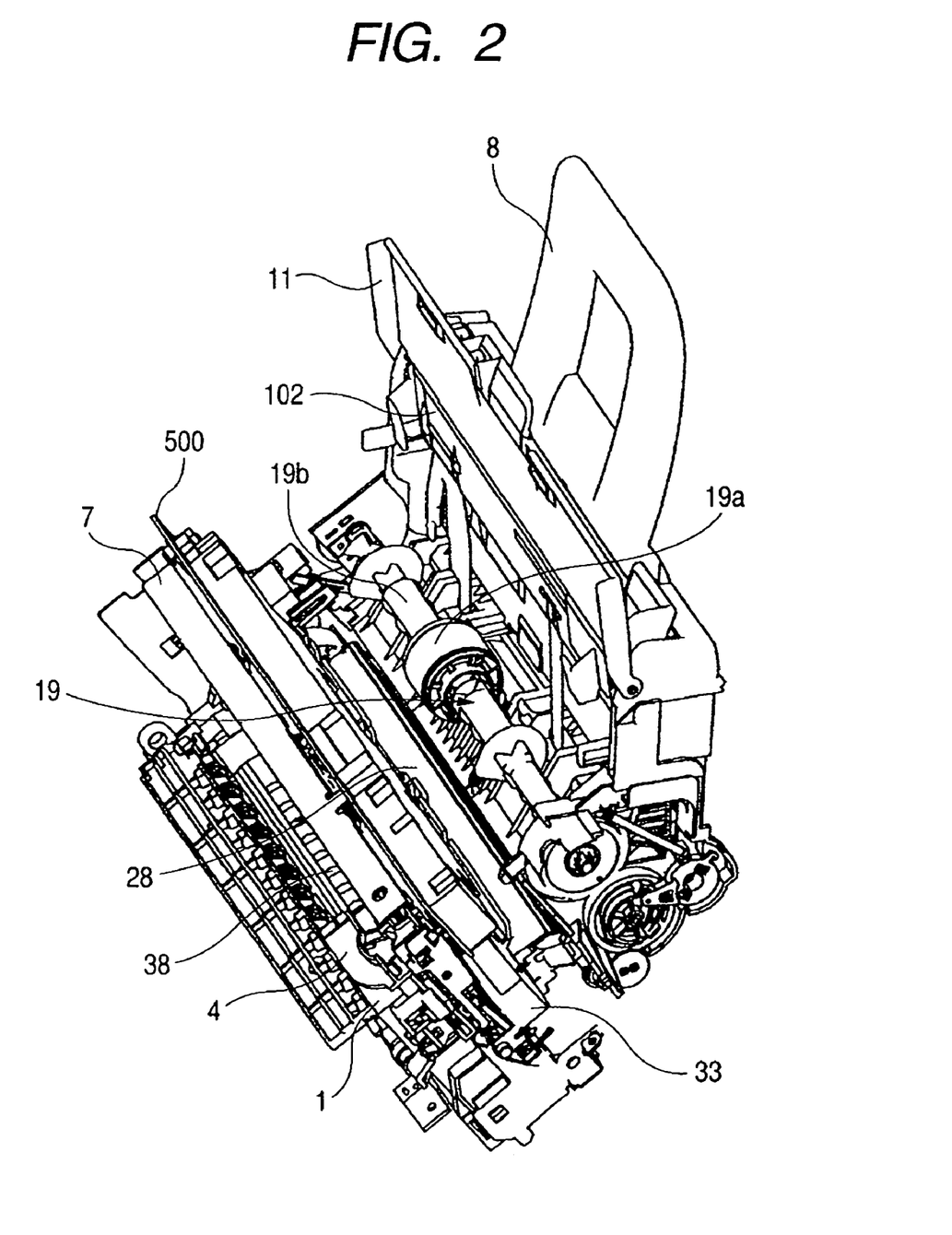
FIG. 2 is a schematic perspective view showing the image reading/recording apparatus as viewed from a right-sided upper portion thereof in FIG. 1.
Figure 3:
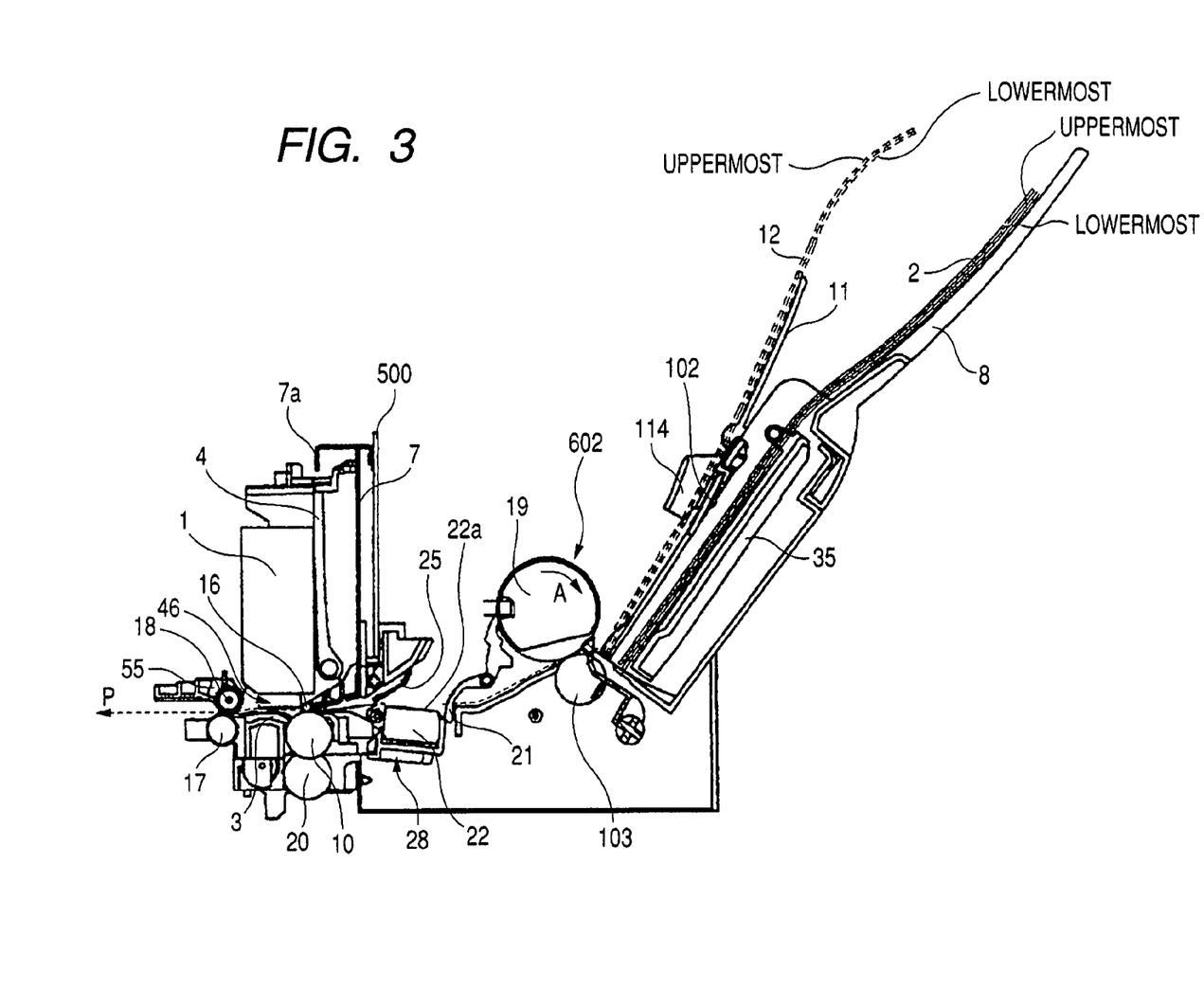
FIG. 3 is a schematic vertical sectional view showing a state in which a white plate is opened in order to clean a contact image sensor (CS) of a reading means in the image reading/recording apparatus in FIG. 1.
Figure 4:
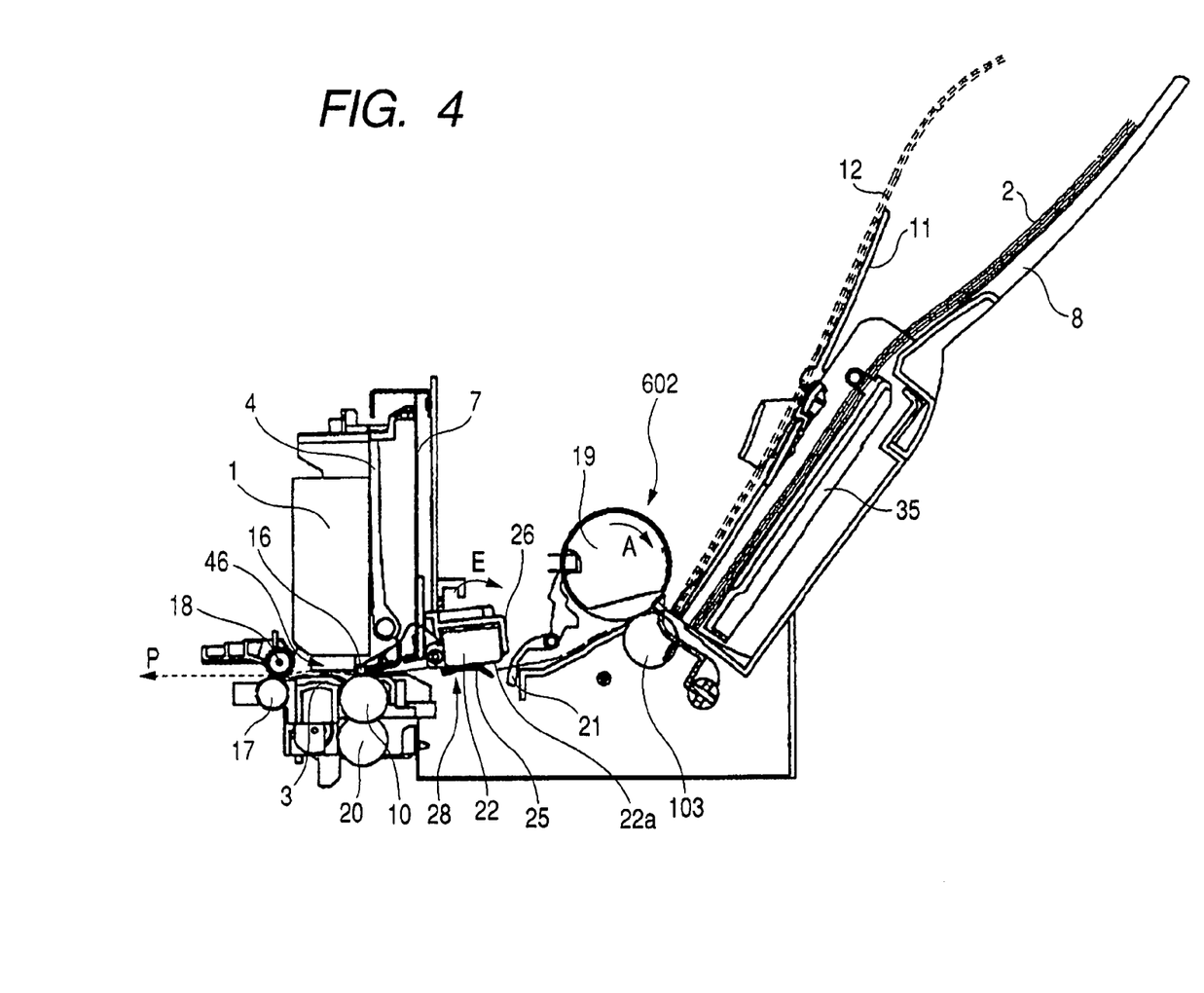
FIG. 4 is a schematic vertical sectional view showing a reference example where the contact image sensor of the reading means in the image reading/recording apparatus in FIG. 1 is inverted in its vertical direction.

An embodiment of the present invention will hereinafter be specifically described with reference to the drawings. Note that the same numerals designate the same or corresponding portions throughout the drawings. An image reading/recording apparatus according to the present embodiment has a recording function of recording an image on a recording sheet serving as a recording medium and a reading function of reading the image retained on an original (document), wherein a recording portion having the recording function and a reading portion having the reading function are disposed on a conveying path common to the recording sheet and to the document. FIG. 1 is a schematic vertical sectional view showing a configuration of one embodiment of the image reading/recording apparatus according to the present invention. FIG. 2 is a schematic perspective view showing the image reading/recording apparatus as viewed from a right-sided upper portion thereof. FIG. 3 is a schematic vertical sectional view showing a state in which a white plate 25 is opened in order to clean a contact image sensor (CS) 22 of a reading portion 28 in the image reading/recording apparatus in FIG. 1. FIG. 4 is a schematic vertical sectional view showing a reference example where the contact image sensor 22 of the reading portion 28 in the image reading/recording apparatus in FIG. 1 is inverted in its vertical direction.

Figure 5:
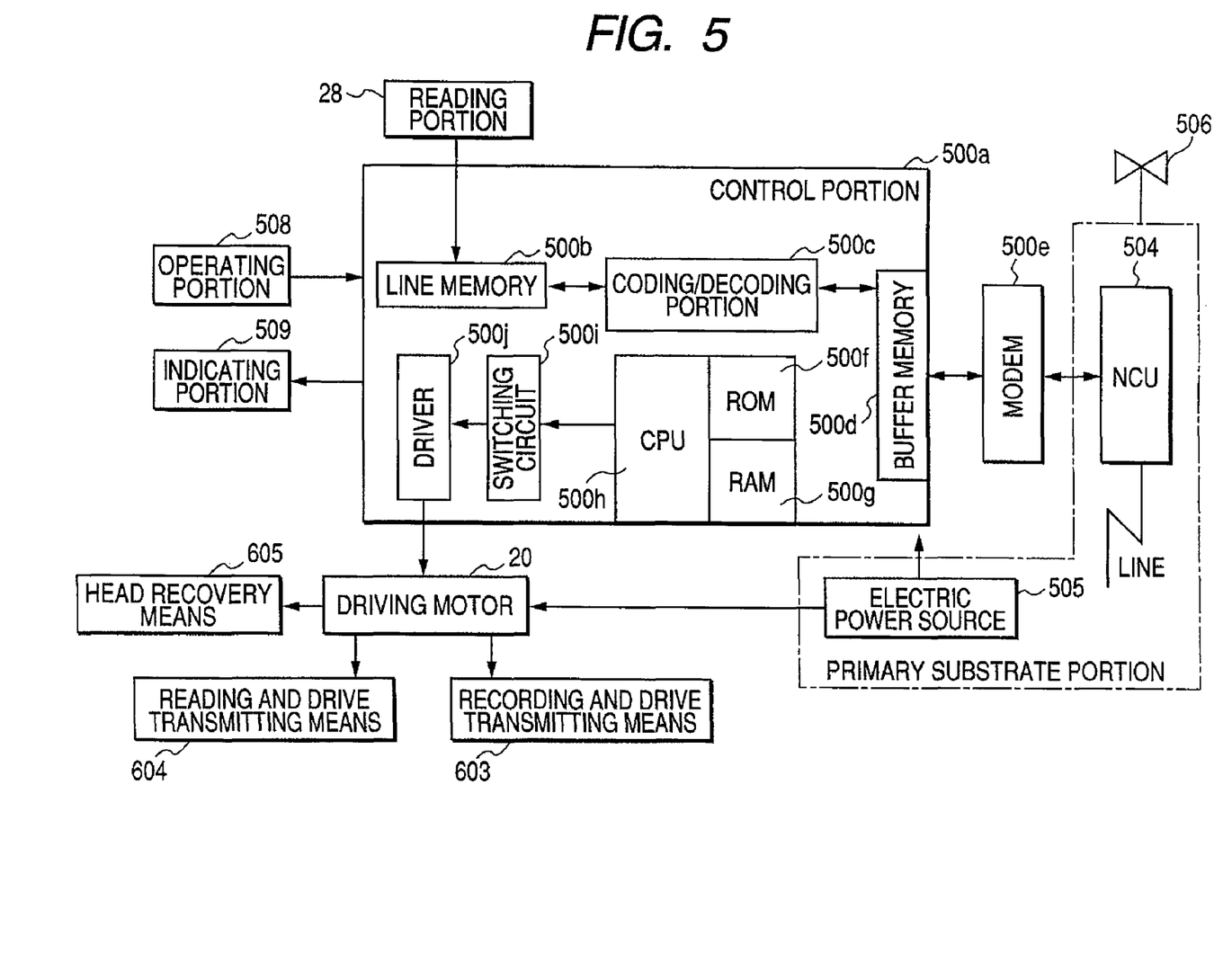
FIG. 5 is a block diagram showing the control board of the image reading/recording apparatus in FIG. 1 and respective functional portions connected to the control board.

To start with, a whole configuration will be explained with reference to FIGS. 1 to 3. Referring to FIGS. 1 to 3, a chassis 7 of a recording portion 46 is provided with a guide rail 7a for reciprocating (main-scanning) a carriage 4 mounted with a recording head (which is a cartridge in the present embodiment) 1 defined as a recording portion in widthwise directions of the apparatus. A control board 500 for controlling the whole apparatus is attached to a rear surface of the chassis 7. FIG. 5 is a block diagram showing the control board 500 of the image reading/recording apparatus in FIG. 1 and respective functional portions connected to the control board 500. In FIG. 5, the control board 500 is connected via unillustrated cables to a drive motor 20 for conveying sheets (recording sheets and documents (originals)), a carriage drive motor 33 (FIG. 2), an unillustrated speaker, an operating portion 508 a reading portion 28 for reading an image, a power source 505, a telephone 506, a NCU (Network Control Unit) 504 for connecting a line, and so on.

Referring to FIGS. 1 to 3, further backward of the control board 500, there are disposed a base member 35 for stacking (loading) recording sheets 2 and documents 12, a sheet feeding tray 8 that assists stacking the recording sheets 2 and the documents 12 and a separation feeding means (separation feeding portion) 602 for separating and thus feeding the recording sheets 2 and the documents 12. The separation feeding portion 602 feeds the documents 12 or the recording sheets 2 toward the reading portion 28 and the recording portion 46 in such a way that a feeding roller 19 rotates in the direction of the arrowhead A in FIG. 1, whereby the separation feeding portion 602 sequentially separates the documents or the recording sheets from the uppermost document or sheet. At this time, a retard roller 103 functions as a brake member against the sheets (the documents 12 or the recording sheets 2) other the uppermost sheet. The retard roller 103 operates in cooperation with an unillustrated torque limiter, and separates and thus feeds only the uppermost sheet by rotating in the direction of the arrowhead B or stopping when only the uppermost sheet is fed and by rotating in the direction opposite to the arrowhead B or stopping when the uppermost sheet and other sheets are fed together simultaneously.

The recording sheets 2 and the documents 12 are stacked while being separated by a separator 102 detachably attached to a pressure plate 9. In the present embodiment, the documents 12 are stacked on the side of an upper surface of the separator 102. The separator 102 is fitted with a slider 114 that is bilaterally movable corresponding to a size of the document. The recording sheets 2 or the documents 12 fed in separation by the separation feeding portion 602 reach at first the reading portion 28. The recording sheets 2 or the documents 12 passing through the reading portion 28 are conveyed while being pinched by a conveying means constructed of a conveying roller 10 and a plurality (e.g., four pieces) of pinch rollers 16, and reach the recording portion 46. The recording sheets 2 or the documents 12, which finished being recorded or read, are discharged outside the apparatus body by a sheet discharging means constructed of a sheet discharging roller 17 and a spur 18.

Next, a control system for drive-controlling the respective portions will be explained with reference to FIG. 5. Referring to FIG. 5, the symbol 500a represents a control portion mounted mainly on a control board 500 (FIGS. 1 and 2). This control portion 500a is connected to a power source 505, a NCU (Network Control Unit) board 504, a display portion 509, the reading portion 28, a drive motor 20, a carriage drive motor 33 (FIG. 2), and so forth. The power source 505 serves to supply the electric power to the whole apparatus by rectifying an AC commercially available power source. The NCU board 504 connects a telephone 506 and a line. The display portion 509 displays contents, etc., that are inputted from the operating portion 508. The reading portion 28 reads the document 12. A modular is packaged in the NCU board 504.

The control portion 500a includes a CPU (Central Processing Unit) 500h for controlling the whole apparatus, a ROM (Read-Only Memory) 500f stored with various categories of programs and various items of data, a RAM (Random Access Memory) 500g that is used as a work area for the CPU 500h and temporarily stores the various items of data such as a recording sheet count. A line memory 500b serves to store images on the respective lines of image data. The line memory 500b is stored with the image data for one line, which is given from the reading portion 28, in the case of transmitting (transferring) or copying the document image, and is stored with the decoded image data for one line in the case of receiving the image data. Then, the various items of data stored in the line memory 500b are outputted to the recording means, thereby recording the images.

A coding/decoding portion 500c provided in the control portion 500a codes the image information to be transmitted by MH (Modified Huffman) coding, etc., and performs conversion into the image data by decoding the coded image data received. A buffer memory 500d is stored with the transmitted/received coded image data. According to the present embodiment, a constant current type pulse motor is employed as the drive motor 20. The drive motor 20 is driven in such a way that a motor driver 500j converts a signal transmitted from an output port of the CPU into a phase signal, and the phase signal is transmitted to the drive motor 20.

In the present embodiment, the same drive motor 20 performs an operation of separating, feeding and thus conveying the recording sheets 2, a reading operation of moving (conveying) the document 12 via the reading portion 28 simultaneously when separating and thus feeding the document 12, and a head recovery operation for maintaining and recovering image recording performance of the recording head 1. Namely, an unillustrated drive switchover means can switch over the transmission of the driving force when the drive motor 20 rotates forward so that the driving force can be transmitted to the sheet feeding/conveying mechanism for the recording sheets 2 via a recording and drive transmitting means 603 and can be transmitted to the sheet feeding/conveying mechanism for the documents 12 via a reading and drive transmitting means 604. Moreover, the driving force when the drive motor 20 rotates reversely is transmitted to a head recovery means 605 (FIG. 5) via a unidirectional transmitting means such as a one-way clutch.

The conveyance of the recording sheets 2 requires a high feeding accuracy per line, and hence the driving torque needed for the reading operation and the driving torque necessary for the recording/recovery operations take different values. Such being the case, when entering the reading operation, a reference current value to the driver 500j is changed by transmitting a High signal (switchover signal) to a switchover circuit 500i from the port of the CPU 500h, thus switching over a peak current of the drive motor 20. With this switchover, it is possible to actualize cost-down by sharing the same drive motor 20 and to actualize more silent running by controlling the current in accordance with the required torque.

The control portion 500a is further provided with a PES (Paper Edge Sensor) 21 for detecting sheet leading/tailing edges (of the recording sheet and the document), an RPS (Roller Position Sensor) for detecting a rotational phase of the sheet feeding roller 19, and an unillustrated DS (Document Sensor) for detecting whether there is the document or not.

Next, the recording means will be described with reference to FIG. 1. The recording head 1 defined as the recording means serves to record the image on the recording sheet 2 conveyed by the conveying roller 10 or the sheet discharging roller 17. In the present embodiment, the recording means involves using the recording head 1 constructed of ink cartridges, wherein the images are recorded based on the image data by jetting out inks selectively from a plurality of discharge ports arrayed on a discharge surface. The image is formed on an upper surface of the recording sheet 2 by this recording head 1. Further, the ink cartridge (recording head) 1 has a plurality of fine discharge portions (nozzles), liquid paths communicating with the respective discharge ports, energy operating portions disposed in part of the liquid paths and an energy generating means for generating an liquid droplet jetting energy in each energy operating portion.

The configuration employing such an inkjet type recording means is advantageous in terms of downsizing and a running cost. There is, however, a possibility that the ink might be adhered to the periphery of the recording head 1 due to the ink mist (mist-like minute ink droplets) occurred along with the discharging of the ink droplets, and therefore a design of layout requires attention. In the present embodiment, for avoiding inconvenience caused by the ink mist, a contact image sensor (which is also abbreviated to CS) 22 configuring the reading portion 28 is disposed upstream of the conveying roller 10 and in a position shielded by the chassis 7 from scattered inks. It is therefore feasible to eliminate apprehension about the ink mist when recording. Moreover, the reading portion 28 is disposed away upstream in the conveying direction from an image forming surface on the recording sheet 2 in the recording portion 46, and hence, even if a paper jam etc occurs in the recording portion 46, it is possible to avoid such a trouble that the unfixed ink is adhered to the reading surface of the CS 22 and to a white plate (white reference) 25.

The inkjet recording apparatus that performs recording by jetting out the inks from the minute discharge ports has a possibility that an image quality declines due to bubbles and dusts entering inward the discharge port or a discharge failure caused by thickening (increased viscosity) or sticking of the ink as a concomitant of evaporation of an ink solvent. Such being the case, in the present embodiment, removable of factors for the discharge failure involves refreshing the ink within the discharge port and providing the head recovery means 605 for cleaning the peripheral portion of the discharge port.

Given next is an explanation of the recording portion 46 for recording the image on the recording sheet 2 by the recording head 1 mounted on the carriage 4. Referring to FIGS. 1-3, the carriage 4 mounted with the recording head 1 scans the recording sheet 2 in the widthwise direction, and is guide-supported in a manner of being movable in reciprocation along a guide shaft not shown) and the guide rail 7a that are installed in parallel with each other in the widthwise direction of the apparatus body. This carriage 4 is driven in reciprocation by the carriage drive motor 33 (FIG. 2) through an endless timing belt looped round a pulley (not shown). Thus, the image is recorded while the recording head 1 on the carriage 4 main-scans the recording sheet 2. The record in this case is conducted by driving the recording head 1 on the basis of the image data in a way that synchronizes with the movement of the carriage 4.

Upon finishing the record for one line, the recording sheet 2 is fed with only a predetermined amount in the conveying direction (a subscan direction), and subsequently the recording head 1 is again driven in a way that synchronizes with the movement of the carriage 4, thus recording the image for one line. The recording on the entire recording sheet 2 is conducted by alternately repeating the recording for one line and the sheet feed at a predetermined pitch. The sheet feed (conveyance) of the recording sheet 2 is performed by rotating, with a predetermined amount, the conveying roller 10 that is drive-connected to the drive motor 20. If the amount of rotation of the conveying roller 10 gets unstable for some reason (e.g., a single unit failure of the motor), a pin hole appears in the image due to an excess of the amount of rotation and printing overlapped (overlap printing; a black streak) with the previous line due to deficiency of the amount of rotation, thereby causing the decline of the image quality. Therefore, the high accuracy is required of the amount of conveyance (the amount of rotation) of the conveying roller 10.

Normally, a standby position (a position in FIG. 2) of the carriage 4 is set at a right edge portion of the guide rail 7a, and, in this standby position, the discharge surface of the recording head 1 is capped by a cap composed of a rubber-like elastic member so that the periphery to the discharge port does not get dried. Further, on the occasion of the reading operation, the carriage 4 stops in the standby position. When exchanging the ink cartridge 1 if the ink is consumed out, the ink cartridge 1 is exchanged by removing the cartridge on a user's side in a capping position shown in FIG. 2.

Next, the separation feeding means 602 that separates and thus feeds the recording sheets 2 and the documents 12 sheet by sheet, will be described. Referring to FIGS. 1-3, the sheet stacking portion is provided with the base member 35, and the plural recording sheets 2 are stacked on the sheet feeding tray 8 provided on the base member 35. Further, the numeral 19 designates a feeding roller for separating and feeding only the uppermost sheet. The feeding roller 19 is constructed by fitting a friction elastic member 19a to a cylindrical portion formed at one portion of a plastic-molded shaft member 19b and having a larger diameter than the shaft member 19b.

Both of the side end portions of the shaft member 19b are axially supported on the base member 35, of which one side end is drive-connected to the drive motor 20 via the recording and drive transmitting means 603 (FIG. 5). The pressure plate 9 is positioned between the feeding roller 19 and the base member 35 and is rotatably axially supported on the base member 35. This pressure plate 9 is so driven by a cam formed integrally with the feeding roller 19 as to abut on and separate from an outer peripheral surface of the feeding roller as the feeding roller rotates (in the direction of the arrowhead A in FIG. 1). The feeding operation of the recording sheet 2 is conducted based on the reference of a right-sided surface of the base member 35. Further, the friction elastic member 19a is disposed approximately at the center of the document 12 in the widthwise direction.

The feeding roller 19 takes a substantially D-shape in section. The feeding roller 19 remains stopping in such a position that a D-shaped notched portion faces the recording sheet or the document in the standby state shown in FIG. 1. When the driving force of the drive motor 20 is transmitted to the recording and drive means 603 (FIG. 5) via the conveying roller 10, the feeding roller 19 of the separation feeding means 602 rotates. Here, the sheets (the recording sheets 2 or the document 12) abutting on the friction elastic member 19a of the feeding roller 19 are blocked by the retard roller 103, however, only the uppermost sheet directly abutting on the feeding roller (the friction elastic member 19a) is separated by the frictional force with the feeding roller and is ejected (fed out) in a way that runs over the opposite portion of the retard roller 103.

After the feeding roller 19 has made one rotation, the notched portion (D-cut portion) moving back from the circumference again faces the recording sheet or the document, and the pressure plate 9 is pushed up by the cam, whereby the feeding roller 19 returns to the standby state. Therefore, when the recording sheet 2 or the document 12 is conveyed by the conveying roller 10, it does not happen that the recording sheet or the document is brought into contact with the feeding roller 19. Hence, the recording sheet 2 can be conveyed with high accuracy by the conveying roller 10 without being affected by back-tension etc. If the recording sheet does not reach the PES (paper edge sensor) 21 even when starting the separation feeding operation, the separation feeding operation is re-executed. Nevertheless, if the PES 21 is not switched ON, the operation of conveying the recording sheet 2 or the document 12 stops with an error, and an error message is displayed on the display portion 509 (FIG. 5).

Next, the operation of conveying the recording sheets 2 will be described with reference to FIGS. 1 and 2. The uppermost sheet in the plurality of recording sheets 2 stacked on the pressure plate 9 is separated and thus fed by the separation feeding means 602 constructed of the feeding roller 19 and the retard roller 103, and is guide-fed through between the white plate 25 of the reading means 28 and the CS (contact image sensor) 22. Subsequently, the uppermost recording sheet 2 is guide-fed along the upper surface of the platen 3 functioning as a support surface on the underside of the recording sheet conveying path. Then, the recording sheet 2 is nipped by a nip portion between the feeding roller 10 axially supported on the platen 3 and the pinch roller r rollers 16 serving as the conveying roller, whereby the recording sheet is conveyed by the conveying means 10 and 16. An image is recorded on the upper surface of the recording sheet 2 by the recording head 1 disposed upwardly of the platen 3, and the image-recorded recording sheet 2 is nipped by a nip portion between the sheet discharging roller 17 and a sheet discharging means constructed of a plurality of spurs 18 and thus conveyed, thereby discharging the recording sheet 2 outside the apparatus body.

The pinch rollers 16 are constructed of a plurality (e.g., four pieces) of rollers arrayed in the sheet widthwise direction so as to abut on the conveying roller 10. A configuration is that each of the pinch rollers 16 is axially supported on a pinch roller guide 36, and the pinch roller guide 36 is biased by a spring and is press-fitted to the conveying roller 10. The sheet discharging roller 17 described above is integrally molded of plastic, elastomer, etc. The aforementioned spur 18 is axially supported on a spur holder 55, and the spur holder 55 is biased by a spring, thereby pushing the spur 18 against the sheet discharging roller 17. Moreover, a plurality of ribs 38 (FIG. 2) extending in the conveying direction is formed in a parallel state in the sheet widthwise direction on a recording sheet support surface of the platen 3. When conveying the recording sheet 2 on the occasion of the recording operation, etc., the recording sheet 2 is guided along the upper surfaces of the ribs 38.

The conveyance by the conveying roller 10 and the pinch rollers 16 is set in an oblique downward direction toward the downstream side from the upstream side, and the conveyance by the sheet discharging roller 17 and the spur 18 is set in an oblique downward direction toward the downstream side from the upstream side. With this setting, the sheet 2 can be conveyed (in a direction of an arrowhead P in FIG. 1) by the conveying means 10 and 16 with the high accuracy in a stable state by causing neither floating nor fluttering in a way that makes the recording sheet abut on the recording sheet support surface (upper surface) of the platen 3.

The recording operation is done by driving the recording head 1 in accordance with the image information in a way that synchronizes with the main scan movement of the carriage 4. As in the present embodiment, the recording head 1 is of the inkjet type, the ink droplets are jet out corresponding to the image information selectively from the plurality of discharge ports formed in the discharge surface of the recording head 1, thereby recording the image. This recording operation is executed by sequentially separating and thus feeding sheet by sheet the plurality of recording sheets stacked on the pressure plate 9 (the recording sheet tray 8) from the uppermost sheet, and performing the record during the conveyance through the underside (the upper side of the platen 3) of the recording head 1. In this case, the image is recorded on the upper surface of the recording sheet sequentially from the uppermost sheet in the stacked recording sheets, the recording sheet is sequentially discharged in a state of the image-recorded surface being directed upward, and the recording sheets are stacked on the sheet discharge tray, etc., sequentially from the uppermost recording sheet. Namely, the post-record recording sheets 2 are discharged and then stacked in such a way that the first image-recorded recording sheet is placed undermost while the last image-recorded recording sheet is placed uppermost in the state of the recording surface being directed upward.

Next, the reading operation by the reading portion 28 will be explained. The reading portion 28 is constructed of the CS (contact image sensor) 22, the white plate (white reference) 25 and the CS holder 26. In the present embodiment, the feeding roller (pickup roller) 19 is disposed above the document stacking surface configured by the separator 102 and the document tray 11. Therefore, it follows that the plurality of stacked documents 12 is separated and thus fed sequentially from the uppermost document. The reading portion 28 is, as illustrated in FIGS. 1 and 3, disposed taking such a posture that the white plate 25 is positioned upward while the CS 22 is positioned downward with the document 12 interposed therebetween. Accordingly, a reading surface (glass surface) 22a (FIG. 3) of the CS 22 is directed upward in FIGS. 1 and 3. Namely, in the image reading/recording apparatus according to the present embodiment, the separation feeding means 602, the reading means 28, the conveying means 10 and 16, and the sheet discharging means 17 and 18 are arranged in sequence from the upstream side in the conveying direction, wherein the reading means 28 is disposed with its reading surface directed upward so as to read the undersurface of the document 12.

Further, the white plate 25 is rotatably axially supported on the CS holder and can be rotationally operated between, as shown in FIG. 1, a closing position (using position) that faces the reading surface 22a of the CS 22 at a predetermined interval and an opening position in which to open the reading surface 22a as shown in FIG. 3. As illustrated in FIG. 3, in the state where the white plate 25 is opened, the user can easily access the reading surface 22a of the CS 22. Accordingly, even when the inks and foreign matters such as paper powder are adhered to the reading surface 22a to deteriorate the reading image as by black lines, white lines, etc, the reading surface 22a can be readily cleaned, and the deterioration of the reading image can be eliminated.

As shown in FIG. 4, in the configuration related to the reference example in which the reading portion 28 is attached in the way that the reading surface 22a of the CS 22 is directed downward, it follows that the CS 22 reads the upper surface of the document 12, and the reading direction is vertically reversed to the configuration in FIG. 1 (the present embodiment). Hence, the surface side (upper surface side) of each of the plurality of stacked documents 12 can be read sequentially from the uppermost document, thereby enabling the user to read the surface sides of the plurality of stacked documents according to the sequence from the uppermost document (uppermost layer). In the configuration shown in FIG. 4, however, inconvenience is that it is quite difficult to clean, if contaminated, the reading surface 22a of the CS 22 and the opposite surface of the white plate 25.

As in the reference example shown in FIG. 4, when attached so that the reading surface 22a of the CS 22 is directed downward (undersurface), for example, what is given as below can be considered as a means for cleaning the reading surface 22a and the white plate 25. It is considered as a cleaning method that an opening is formed in a part, facing the CS 22, of the bottom surface of the apparatus body, and the user cleans from the bottom surface side of the apparatus body by turning back the apparatus body. Such a method of cleaning from the bottom surface side of the apparatus body has difficulty of judging whether the inks and the foreign matters such the dusts are removed or not because of the reading surface 22a and the white plate 25 existing in the further deep positions from the bottom surface of the apparatus. Moreover, the opposite portion (the lower part) of the CS 22 on the bottom surface side of the apparatus becomes an empty space to the apparatus body, and consequently such inconvenience arises that space efficiency decreases and the apparatus body is upsized.

Moreover, in the configuration in FIG. 4, a cleaning method is considered, wherein the direction of the reading surface 22a is temporarily changed upward by rotating only the reading means (reading portion) 28 itself or the CS 22 in a direction of an arrowhead E in FIG. 4, and, in this state, the user cleans the reading surface 22a and the white plate 25. However, either the reading portion 28 or the CS 22, whichever is taken, requires a cable and an electric wiring for transferring the read image data to the CPU 500h (FIG. 5). Further, it is required that the reading surface 22a and the white plate 25 be returned exactly to the original positions within the apparatus body after being cleaned. Hence, this becomes a factor of getting the operating procedures complicated and increasing the cost. Moreover, the empty space is needed for the rotations of the CS 22, etc., and therefore such inconvenience arises that the apparatus body is upsized.

By contrast with this, in the present embodiment illustrated in FIGS. 1 to 3, the image reading/recording apparatus has the recording head 1 defined as the recording means for recording on the recording sheets 2, the reading means 28 for reading the image surface on the document 12, the separation feeding means 602 for sequentially feeding the recording sheets or the documents to the recording means or the reading means sequentially from the uppermost sheet in the stacked sheets, the conveying means 10 and 16 for conveying the recording sheets or the documents, and the sheet discharging means 17 and 18 for discharging the recording sheets 2 or the documents 12, wherein the separation feeding means 602, the reading means 28, the conveying means 10 and 16, the recording means 1, and the sheet discharging means 17 and 18 are disposed in this sequence from the upstream side in the conveying direction, and the reading means 28 is so provided as to read the undersurface of the document 12 with the reading surface 22a directed upward. In addition, the white plate 25 facing the reading surface 22a of the reading means 28 is disposed in an openable/closable manner.

Then, in the present embodiment in FIGS. 1 to 3, the images retained on the plurality of stacked documents 12 are read sequentially from the uppermost document 12, then the order of the documents is reversed after reading all the documents, and the information transferred in sequence from the read information of the lowermost document. Further, the recording head 1 defined as the recording means is disposed to record the image on the upper surface of the recording sheet from the upper side of the recording sheets 2 to be conveyed, and reads the plurality of stacked documents 12 sequentially from the uppermost document, and, in the case of performing a copying operation of recording the read information by the recording means 1 after reading all the documents, the recording means 1 conducts the copying operation by transferring the information from the read information of the uppermost document without reversing the order of the documents.

According to the configuration in FIGS. 1 to 3, to start with, the separation feeding means, the reading means, the conveying means, the recording means and the sheet discharging means are disposed in this sequence from the upstream side in the conveying direction, and the reading means is provided to read the undersurface of the document with the reading surface directed upward. Hence, there is provided the image reading/recording apparatus capable of actualizing the downsizing and the decrease in the cost of the apparatus body by commonizing the components and the functions of the document conveying system and the recording sheet conveying system, and enabling the user to readily clean the contaminated portion even when the reading surface of the reading means and the white surface of the white plate are contaminated.

Moreover, according to the configuration in FIGS. 1 to 3, the plurality of stacked documents is read sequentially from the uppermost document, then the order of the documents is reversed after reading all the documents, and the information transferred in sequence from the read information of the lowermost document. Further, the recording means is disposed to record the image on the upper surface of the recording sheet from the upper side of the recording sheets to be conveyed, reads the plurality of stacked documents sequentially from the uppermost document, and, in the case of performing the copying operation of recording the read information by the recording means after reading all the documents, conducts the copying operation by transferring the information from the read information of the uppermost document without reversing the order of the documents. With this configuration, the documents to be transferred (transmitted) can be transmitted in the paging order of the documents as in the document stacking sequence, and it is possible to receive the copied recording sheets recorded with the read images as in the document stacking sequence.

The reading portion 28 will be further explained with reference to FIG. 1. The reading portion 28 is constructed of the CS 22, the white plate (white reference) 25 and the CS holder 26. The CS 22 is accommodated in a recessed portion formed in the CS holder 26 with the sensor surface (reading surface) 22a directed outside (upside in the illustrated example), and is positioned and fixed by a fastening member (screw) to the CS holder 26.

The white plate 25 is formed by fixing a white plate to a metal plate. This metal plate is constructed of a flat surface to which the white sheet is fixed and bilateral plates formed by bending side portions on both sides in a longitudinal direction. Note that the metal plate described above may also be coated in white instead of fixing the white sheet.

The bilateral plates of the white plate 25 are formed with holes into which spindles provided on the CS holder 26 are fitted. With this arrangement, the white plate 25 is axially supported rotatably (in an openable manner) with respect to the CS holder 26 and the CS 22. Further, the white plate 25 is biased by an unillustrated torsional coil spring toward the CS 22. Moreover, protrusions are provided on the outer surfaces of the bilateral plates of the white plate 25, thereby forming a predetermined gap between the white surface of the white plate 25 and the sensor surface 22a of the CS 22. Namely, in the state where the white plate 25 is biased toward the CS 22, the gap permitting at least one sheet of document to be conveyed is formed between the sensor surface 22a of the CS 22 and the white surface (e.g., the white sheet) of the white plate 25.

The white plate 25 is biased toward the CS 22 by the torsional coil spring and is opened as shown in FIG. 3 resisting the torsional coil spring, thereby enabling the user to surely, if the white surface of the white plate 25 or the reading surface 22a of the CS 22 is contaminated with inks and dusts, clean the contaminated portion.

It should be noted that the embodiment discussed above has exemplified the example in which the recording portion is of the serial type for recording by the recording head mounted on the carriage, however, the present invention can be applied to the image reading/recording apparatuses taking other recording modes such as the image reading/recording apparatuses employing a line-type recording means constructed of a full-line head, etc., wherein the same operations and effects are exhibited. Further, the embodiment discussed above has exemplified the case in which the recording portion is of the inkjet type, however, the present invention is applicable irrespective of the recording types such as a thermal transfer type, a thermo-sensitive type, a laser beam irradiation type and a wire dot type, wherein the same operations and effects are exhibited.

Moreover, the present invention can be similarly applied regardless of the structure and the number of the recording means (recording heads), wherein the same effects can be attained. Still further, the image reading/recording apparatus according to the present invention can be broadly applied to image information reading/recording apparatuses such as an image reading/recording apparatus in a multi-function apparatus constructed by combining a copying machine, a facsimile, an image capturing/forming apparatus, etc., without being limited to only the single apparatus, further an image reading/recording apparatus serving as an input/output device for the multi-function apparatus in a computer system, and so on, wherein the same operations and effects are exhibited.

This application claims priority from Japanese Patent Application Nos. 2005-131886 filed Apr. 28, 2005, which is hereby incorporated by reference herein.

What is claimed is:

1. An image reading/recording apparatus comprising:
a recording unit that records on a plurality of recording sheets;
a reading unit that reads a plurality of documents;
a separation feeding unit that sequentially feeds the plurality of recording sheets or the plurality of documents to said recording unit or said reading unit sequentially from an uppermost sheet in a sheet stack of the plurality of recording sheets or a sheet stack of the plurality of documents;
a conveying unit that conveys the plurality of recording sheets or the plurality of documents; and
a sheet discharging unit that discharges the plurality of recording sheets or the plurality of documents,
wherein said separation feeding unit, said reading unit, said conveying unit, said recording unit, and said sheet discharging unit are disposed in this sequence from an upstream side in a conveying direction,
wherein said reading unit is so provided as to read an undersurface of the plurality of document with a reading surface of said reading unit directed upward,
wherein said separation feeding unit includes a feeding roller which rotatably contacts the uppermost sheet in the sheet stack of the plurality of recording sheets or the sheet stack of the plurality of documents, and a retard roller which separates the plurality of recording sheets or the plurality of documents other than the uppermost sheet in the sheet stack of the plurality of recording sheets or the sheet stack of the plurality of documents directly in contact with said feeding roller,
wherein the sheet stack of the plurality of documents is stacked such that image surfaces of the plurality of documents are directed downwards,
wherein said feeding roller contacts an upper surface of the uppermost sheet in the sheet stack of the plurality of documents with an image surface of one of the plurality of documents directed downwards when feeding one of the plurality of documents, and
wherein the sheet stack of the plurality of documents is read sequentially from an uppermost document of the plurality of documents, and, after reading all of the plurality of documents, information read by said reading unit is transferred in a way that reverses the order in which the plurality documents was read from said reading unit.

2. An image reading/recording apparatus according to claim 1, wherein said reading surface of said reading unit and a white plate facing said reading surface are disposed in an openable/closable manner.

3. An image reading/recording apparatus comprising:

a recording unit that records on a plurality of recording sheets;

a reading unit that reads a plurality of documents;

a separation feeding unit that sequentially feeds the plurality of recording sheets or the plurality of documents to said recording unit or said reading unit sequentially from an uppermost sheet in a sheet stack of the plurality of recording sheets or a sheet stack of the plurality of documents;

a conveying unit that conveys the plurality of recording sheets or the plurality of documents; and a sheet discharging unit that discharges the plurality of recording sheets or the plurality of documents, wherein said separation feeding unit, said reading unit, said conveying unit, said recording unit, and said sheet discharging unit are disposed in this sequence from an upstream side in a conveying direction, wherein said reading unit is so provided as to read an undersurface of the plurality of document with a reading surface of said reading unit directed upward, wherein said separation feeding unit includes a feeding roller which rotatably contacts the uppermost sheet in the sheet stack of the plurality of recording sheets or the sheet stack of the plurality of documents, and a retard roller which separates the plurality of recording sheets or the plurality of documents other than the uppermost sheet in the sheet stack of the plurality of recording sheets or the sheet stack of the plurality of documents directly in contact with said feeding roller, wherein the sheet stack of the plurality of documents is stacked such that image surfaces of the plurality of documents are directed downwards, wherein said feeding roller contacts an upper surface of the uppermost sheet in the sheet stack of the plurality of documents with an image surface of one of the plurality of documents directed downwards when feeding one of the plurality of documents, wherein said recording unit is disposed to record an image on the upper surface of the plurality of recording sheets from an upper side of the plurality of recording sheets to be conveyed, and wherein said reading unit reads the sheet stack of plurality of documents sequentially from an uppermost document of the plurality of documents, and, in the case of performing a copying operation, information read by said reading unit, after reading all of the plurality of documents is transferred to the recording unit without reversing the order of the plurality of documents read from said reading unit.

* * * * *